United States Patent
Raghunathan (10) Patent No.: US 10,560,050 B2
(45) Date of Patent: *Feb. 11, 2020

(54) INNOVATIVE ENERGY GENERATING PHOTOVOLTAIC AWNING

(71) Applicant: EvoluSun Inc., Freemont, CA (US)

(72) Inventor: Rohini Raghunathan, Freemont, CA (US)

(73) Assignee: EvoluSun, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/202,798

(22) Filed: Nov. 28, 2018

(65) Prior Publication Data

US 2019/0386606 A1    Dec. 19, 2019

Related U.S. Application Data

(60) Provisional application No. 62/685,898, filed on Jun. 15, 2018, provisional application No. 62/719,424, filed on Aug. 17, 2018.

(51) Int. Cl.
*E04F 10/08* (2006.01)
*H02S 20/26* (2014.01)
(Continued)

(52) U.S. Cl.
CPC .............. *H02S 20/26* (2014.12); *H02S 20/30* (2014.12); *H02S 40/10* (2014.12); *B60P 3/34* (2013.01);
(Continued)

(58) Field of Classification Search
CPC ......... E04F 10/10; E04F 10/08; E04F 10/005; E04F 10/00; H02S 20/26; H02S 20/30;
(Continued)

(56) References Cited

U.S. PATENT DOCUMENTS 1,813,017 A * 7/1931 Bond ...................... E04F 10/10
160/165
2,187,639 A * 1/1940 Bond ...................... E04F 10/10
160/61
(Continued)

FOREIGN PATENT DOCUMENTS

DE      202009000485    4/2009
EP          1082502      2/2005

*Primary Examiner* — Johnnie A. Shablack
(74) *Attorney, Agent, or Firm* — Law Office of John Stattler (57) ABSTRACT

Apparatus, systems and methods are provided for solar awnings or canopies that include rigid solar modules, for example photovoltaic cells or panels. The awnings have solar modules or panels stacked together substantially vertically (e.g., each module is oriented vertically with respect to the next module). The solar modules in the stack are interconnected to each other, such that each solar module is connected electrically and mechanically to adjacent solar modules. The first solar module in the stack of modules is fixed to one end of the base of the awning. The base of the awning is typically mounted to a building, vehicle, mobile home, or other appropriate structure. The last solar module in the stack is attached to a lead arm of the awning. The lead arm moves back and forth (e.g., away and toward) from the base of the awning to enable the expansion or retraction of the awning.

22 Claims, 3 Drawing Sheets

(51) Int. Cl.
  *H02S 20/30* (2014.01)
  *H02S 40/10* (2014.01)
  *B60P 3/34* (2006.01)
  *B60R 16/03* (2006.01)
  *E04F 10/10* (2006.01)

(52) U.S. Cl.
  CPC ......... *B60R 16/03* (2013.01); *B60Y 2400/216* (2013.01); *E04F 10/10* (2013.01)

(58) Field of Classification Search
  CPC . H02S 20/32; H20S 40/10; B60P 3/34; B60Y 2400/216; B60J 11/00; B60J 11/04
  USPC ................... 160/61, 901, 905, 45, 62, 83.1
  See application file for complete search history.

(56) References Cited

U.S. PATENT DOCUMENTS

| | | | | |
|---|---|---|---|---|
| 2,244,012 A * | 6/1941 | Johnson | E04F 10/10 | 160/165 |
| 2,404,178 A * | 7/1946 | Johnson | E04F 10/10 | 206/326 |
| 2,564,641 A * | 8/1951 | Drake | E04F 10/10 | 160/62 |
| 2,581,827 A * | 1/1952 | Zveibil | E04F 10/10 | 160/62 |
| 2,592,579 A * | 4/1952 | Kramer | E04F 10/10 | 49/71 |
| 2,594,922 A * | 4/1952 | Hawla | E04F 10/10 | 160/62 |
| 2,602,971 A * | 7/1952 | Shaw | E04F 10/08 | 52/473 |
| 2,602,972 A * | 7/1952 | Chalfant | E04F 10/10 | 49/86.1 |
| 2,617,157 A * | 11/1952 | Olson | E04F 10/10 | 49/74.1 |
| 2,629,145 A * | 2/1953 | Parsson | E04F 10/10 | 49/397 |
| 2,631,341 A * | 3/1953 | Pettigrew | E04F 10/10 | 49/74.1 |
| 2,670,792 A * | 3/1954 | Del Rio | E06B 9/92 | 160/23.1 |
| 2,718,920 A * | 9/1955 | Allison | E04F 10/10 | 160/129 |
| 2,730,779 A * | 1/1956 | Schleimer | E04F 10/08 | 52/78 |
| 2,791,008 A * | 5/1957 | Johnson | E04F 10/10 | 49/74.1 |
| 2,967,567 A * | 1/1961 | Heckerman | E04F 10/10 | 160/172 R |
| 2,980,180 A * | 4/1961 | Stephens | E04F 10/10 | 160/168.1 R |
| 3,002,555 A * | 10/1961 | Goldfarb | E04F 10/10 | 160/62 |
| 3,004,591 A * | 10/1961 | King, Jr. | E04F 10/0625 | 160/235 |
| 3,011,225 A * | 12/1961 | Alfred | E04F 10/10 | 49/74.1 |
| 3,634,845 A * | 1/1972 | Colman | G08B 13/04 | 200/61.62 |
| 4,116,258 A * | 9/1978 | Slysh | H01Q 1/08 | 126/245 |
| 4,128,307 A * | 12/1978 | Badertscher | A01G 9/222 | 359/596 |
| 4,592,436 A * | 6/1986 | Tomei | B60L 8/003 | 136/245 |
| 4,726,410 A * | 2/1988 | Fresh | E05D 15/24 | 160/171 |
| 4,739,816 A * | 4/1988 | Dodich | A01G 9/222 | 160/168.1 R |
| 4,926,599 A * | 5/1990 | Scholz | E04F 10/10 | 49/87.1 |
| 4,941,524 A * | 7/1990 | Greer | B60P 3/343 | 160/67 |
| 5,076,634 A | 12/1991 | Muller et al. | | |
| 5,131,955 A * | 7/1992 | Stern | B64G 1/443 | 136/245 |
| 5,258,076 A * | 11/1993 | Wecker | E06B 9/24 | 136/245 |
| 5,433,259 A | 7/1995 | Faludy | | |
| 5,517,358 A * | 5/1996 | Dominguez | F24J 2/542 | 359/591 |
| 5,545,261 A * | 8/1996 | Ganz | B60J 7/00 | 136/251 |
| 5,725,062 A * | 3/1998 | Fronek | B60L 8/00 | 180/165 |
| 5,873,202 A * | 2/1999 | Parks | E04B 7/163 | 49/74.1 |
| 5,961,738 A * | 10/1999 | Benton | B64G 1/44 | 136/245 |
| 6,024,153 A * | 2/2000 | Goldman | E04B 7/166 | 160/370.23 |
| 6,035,874 A * | 3/2000 | Po-Chang | B60J 11/00 | 135/131 |
| 6,423,895 B1 * | 7/2002 | Murphy | H02S 30/20 | 136/245 |
| 6,586,668 B2 * | 7/2003 | Shugar | B60L 8/003 | 136/244 |
| 6,812,397 B2 * | 11/2004 | Lambey | E04F 10/06 | 136/244 |
| 7,357,440 B1 * | 4/2008 | Calandruccio | B60P 3/341 | 296/156 |
| 7,401,635 B2 * | 7/2008 | Grutzner | E06B 7/086 | 160/193 |
| 7,472,739 B2 * | 1/2009 | Heidenreich | E04F 10/0648 | 160/122 |
| 7,576,282 B2 | 8/2009 | Heidenreich | | |
| 7,806,370 B2 * | 10/2010 | Beidleman | B64G 1/222 | 136/245 |
| 7,997,322 B2 | 8/2011 | Knauer | | |
| 8,342,224 B2 * | 1/2013 | Rountree | E04F 10/02 | 160/77 |
| 8,347,935 B2 * | 1/2013 | Svirsky | E04F 10/10 | 160/352 |
| 8,356,454 B2 * | 1/2013 | Napora | E04D 3/08 | 52/747.1 |
| 8,356,652 B2 * | 1/2013 | Westgarth | E04F 10/02 | 160/46 |
| 8,469,022 B2 * | 6/2013 | Cowan | F24S 50/20 | 126/605 |
| 8,528,621 B2 * | 9/2013 | Murphy, Jr. | E04F 10/10 | 160/5 |
| 8,616,721 B1 * | 12/2013 | Woodall, Jr. | F21V 33/006 | 135/88.11 |
| 8,683,755 B1 * | 4/2014 | Spence | B64G 1/222 | 136/245 |
| 8,701,800 B2 * | 4/2014 | Hui | B60K 16/00 | 180/2.2 |
| 8,704,079 B2 * | 4/2014 | Nocito | E04F 10/06 | 136/245 |
| 8,748,729 B2 | 6/2014 | Nocito et al. | | |
| 8,752,880 B1 * | 6/2014 | Morazan | B60J 11/00 | 296/97.1 |
| 8,756,873 B1 * | 6/2014 | Hire | E04F 10/10 | 49/74.1 |
| 8,800,214 B2 * | 8/2014 | Silberman | E04F 10/02 | 160/61 |
| 8,851,560 B1 * | 10/2014 | Freeman | B60J 11/04 | 296/210 |
| 9,046,282 B2 * | 6/2015 | Belikoff | H02S 20/10 | |
| 9,080,374 B2 * | 7/2015 | Gavish | E04F 10/0603 | |
| 9,093,583 B2 | 7/2015 | Hamilton | | |
| 9,145,732 B2 * | 9/2015 | Frigerio | E04F 10/10 | |
| 9,151,069 B2 * | 10/2015 | Bobbio | E04H 12/185 | |
| 9,156,568 B1 * | 10/2015 | Spence | B64G 1/44 | |
| 9,175,511 B2 * | 11/2015 | Whytlaw | E06B 7/096 | |
| 9,222,264 B1 * | 12/2015 | Reid | E04F 10/10 | |
| 9,249,576 B2 * | 2/2016 | Westgarth | E04F 10/02 | |

(56) References Cited

U.S. PATENT DOCUMENTS

| | | | |
|---|---|---|---|
| 9,255,441 B2* | 2/2016 | Shargani | E04H 15/58 |
| 9,300,169 B1* | 3/2016 | Bardy | H02S 10/40 |
| 9,318,995 B2* | 4/2016 | Snidow | H02S 30/20 |
| 9,470,012 B2* | 10/2016 | Shargani | E04F 10/02 |
| 9,777,483 B2* | 10/2017 | Secco | E04F 10/10 |
| 9,831,366 B1* | 11/2017 | Stribling | H02S 30/20 |
| 10,234,003 B2* | 3/2019 | Martyn | F16H 21/04 |
| 2004/0261955 A1* | 12/2004 | Shingleton | F24J 2/04 160/84.06 |
| 2007/0006907 A1 | 1/2007 | Yueh | |
| 2007/0056579 A1* | 3/2007 | Straka | E04D 13/033 126/570 |
| 2007/0240832 A1* | 10/2007 | Cavarec | E04F 10/0618 160/70 |
| 2008/0100258 A1* | 5/2008 | Ward | H01M 10/465 320/101 |
| 2008/0143292 A1* | 6/2008 | Ward | B60L 8/003 320/101 |
| 2008/0163984 A1* | 7/2008 | Lambey | E04F 10/02 160/2 |
| 2009/0014130 A1* | 1/2009 | Heidenreich | E04F 10/0607 160/66 |
| 2009/0031641 A1* | 2/2009 | Grazioso | E04F 10/02 52/74 |
| 2009/0032100 A1* | 2/2009 | Oak | E04F 10/005 136/259 |
| 2009/0056884 A1* | 3/2009 | Vogt | E04F 10/02 160/62 |
| 2009/0288891 A1* | 11/2009 | Budge | B60K 16/00 180/2.2 |
| 2010/0065104 A1* | 3/2010 | Baruh | B63B 15/0083 136/251 |
| 2010/0077680 A1* | 4/2010 | Banister | H02S 40/38 52/173.3 |
| 2010/0156339 A1* | 6/2010 | Hoffman | H02J 7/355 320/101 |
| 2010/0193261 A1* | 8/2010 | Freeman | B60K 16/00 180/2.2 |
| 2011/0056486 A1* | 3/2011 | North | F24S 40/85 126/706 |
| 2011/0061711 A1* | 3/2011 | Luo | H01L 31/0488 136/244 |
| 2011/0088855 A1* | 4/2011 | Boustani | B60J 11/02 160/370.22 |
| 2012/0073885 A1* | 3/2012 | Glynn | B60K 16/00 180/2.2 |
| 2012/0260968 A1* | 10/2012 | Enrile Medina | H02S 30/10 136/246 |
| 2013/0011583 A1 | 1/2013 | Knauer | |
| 2013/0056159 A1* | 3/2013 | Gray | E04F 10/10 160/40 |
| 2013/0284234 A1* | 10/2013 | Funayama | H01L 31/03928 136/245 |
| 2014/0076378 A1* | 3/2014 | Hamilton | H02S 20/10 136/245 |
| 2014/0109955 A1* | 4/2014 | Papanaklis | E04B 7/166 136/251 |
| 2014/0116497 A1* | 5/2014 | Sanders | E06B 7/086 136/246 |
| 2014/0214249 A1* | 7/2014 | Freeman | B60L 8/003 701/22 |
| 2014/0224434 A1* | 8/2014 | Gross | E06B 9/42 160/127 |
| 2014/0262059 A1* | 9/2014 | Gelsebach | E04F 10/02 160/22 |
| 2014/0297072 A1* | 10/2014 | Freeman | B60L 8/003 701/22 |
| 2015/0092400 A1* | 4/2015 | Vincenzi | E06B 9/386 362/183 |
| 2016/0173025 A1* | 6/2016 | Baumgartner | H02S 30/20 136/245 |
| 2016/0222672 A1* | 8/2016 | Westgarth | E04F 10/02 |
| 2016/0265231 A1* | 9/2016 | Gelsebach | E04F 10/02 |
| 2017/0191273 A1* | 7/2017 | Eilam | E04F 10/0666 |
| 2017/0207744 A1* | 7/2017 | Densham | H02S 40/22 |
| 2017/0275884 A1* | 9/2017 | Thompson | E04F 10/0633 |
| 2017/0336104 A1* | 11/2017 | Tenghoff | F24S 40/85 |
| 2017/0350133 A1* | 12/2017 | Chung | E04F 10/02 |
| 2018/0030781 A1* | 2/2018 | Hall | H02S 20/32 |
| 2018/0102734 A1* | 4/2018 | Katz | H02S 30/20 |
| 2018/0106046 A1* | 4/2018 | Castel | E04F 10/02 |
| 2018/0159464 A1* | 6/2018 | Kingsley | H02S 20/24 |
| 2018/0162259 A1* | 6/2018 | Lin | B60P 3/34 |
| 2018/0319310 A1* | 11/2018 | Zhou | H04N 5/23238 |
| 2018/0320382 A1* | 11/2018 | De Ridder | H02S 20/10 |
| 2018/0370415 A1* | 12/2018 | Mathiasen | B60P 3/343 |
| 2019/0006984 A1* | 1/2019 | Albertella | H02S 20/30 |
| 2019/0010707 A1* | 1/2019 | Thompson | E04F 10/0633 |
| 2019/0169853 A1* | 6/2019 | Bai | E04F 10/0611 |

* cited by examiner

INNOVATIVE ENERGY GENERATING PHOTOVOLTAIC AWNING

This application claims priority to U.S. provisional application No. 62/685,898 filed on Jun. 15, 2018, and U.S. provisional application No. 62/719,424 filed on Aug. 17, 2018. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

This invention is related to the field of expandable solar power generating systems. More specifically this application relates to a design for a novel photovoltaic awning system that can be expanded or retracted as needed.

BACKGROUND

The following description includes information that may be useful in understanding the present invention. It is not an admission that any of the information provided herein is prior art or relevant to the presently claimed invention, or that any publication specifically or implicitly referenced is prior art.

Many building and vehicles such as recreational vehicles (RV's) and boats use visors, awnings, canopies or blinds to protect against solar radiation, provide shade and keep buildings or vehicles cool. These structures are common place and several prior arts exists for these solutions.

People have also attempted to incorporate solar panels into these shade providing structures. For example, U.S. Pat. No. 5,076,634 describes a solar visor with solar modules mounted on an outward sun facing surface that can be mounted on a vehicle for converting solar energy into electrical energy.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

U.S. Pat. No. 9,093,583 describes method of incorporating solar cells into a transportable canopy. This patent describes a solar canopy structure capable of folding into a compact form for transporting, and for simple unfolding for attachment to a base. However, once transported to the site of installation, this foldable canopy requires a ground mounted support beam on which the solar panels are deployed unlike our embodiment where the solar panels can be mounted on a vertical surface and can be truly mobile.

U.S. Pat. No. 7,576,282, DE202009000485, U.S. Pat. Nos. 5,433,259, 8,748,729 and EP1082502 all describe retractable awnings that incorporate solar cells. U.S. Pat. Nos. 7,576,282, 8,748,729 and EP1082502 describe embodiments in which the solar modules are flexible and roll-able and the expansion/retraction of the awning is achieved by rolling the thin film solar modules onto a rotating drum at the base of the awning, just as you would with a traditional awning. The issue with this methodology is that all these solutions require the use of thin film solar cells in a roll-able fabric like form. Such roll-able film solar panels either do not have high enough efficiencies (as in the case of amorphous silicon cells) or are very expensive (like III-V cells or CIGS). Additionally, the rolling and un-rolling of the thin film solar cells lead to fatigue in the cells and has the potential to reduce its life span. U.S. Pat. No. 5,433,259 and DE202009000485 also use the rotation of the awning fabric on a roller to operate the awning, however in these embodiments the solar cells are rigid and are integrated as a strip at the beginning or the end of the awning fabric, locations where rotation on the roller does not happen. The issue with this approach is that energy generating surface area in these embodiments is limited given that only a narrow solar strip can be incorporated in these designs. Hence not enough energy can be generated from these implementations. No attempt has been made to design an entire awning using standard solar cells that are more rigid.

U.S. Pat. No. 7,997,322 and US20130011583 describe a structural element that can be used as a covering device for surfaces or for windows, doors, or similar openings and has movable elements joined in zigzag fashion and is capable of being fanned out and closed like a fan. The author has suggested that solar cells can be incorporated into the movable element. However, the fundamental claim in this application assumes a pivotal motion of the various elements around a pivot axis, which is inherently different from the mechanism of our embodiment where the panels are pulled away from the base laterally using an accordion type of movement. In these referenced patents, the motion of the fan from its retracted state to its expanded state and back to its retracted state occurs on the surface on which it is mounted unlike in the inventive subject matter where the panels extend away from the surface on which it is mounted for its operation.

Thus, there is still a need for solar awning systems that are portable and collapse easily.

SUMMARY OF THE INVENTION

The present invention provides a unique, smart and commercially deployable, expandable photovoltaic awning and canopy systems. Photovoltaic awnings and canopy systems are collectively referred to herein as awnings.

The inventive subject matter provides apparatus, systems and methods related to solar awnings or canopies (e.g., awnings comprising photovoltaic elements). The awning system has solar modules or panels stacked together vertically (e.g., each module is oriented vertically with respect to the next module). Viewed from another perspective, the stack is horizontal in that adjacent modules are stacked to the left and right of each module, with the stack growing to the left or right. The solar modules in the stack are interconnected to each other, both mechanically and electrically. For example, a solar module is connected electrically and mechanically to adjacent solar modules. The first solar module in the stack of modules is fixed to one end of the awning, called the base. The base of the awning is typically mounted to a building, vehicle, mobile home, or other appropriate structure. The last solar module in the stack is attached to the arm of the awning, also referred to as the lead arm. The lead arm moves back and forth (e.g., away and toward, etc.) from the base of the awning to enable the expansion or retraction of the awning. It should be appreciated that as the lead arm moves away from the base, the awning is expanding, and when the lead arm moves toward the base, the awning is retracting.

The movement of the lead arm of the awning away from and towards the awning base is enabled by any appropriate means, such as using hinged retractable arms in a "v" shape that fold between closed conformations (e.g., "v" with acute angle, 0° angle, etc.) and open conformations (e.g., "v" with 90° angle, obtuse angle, etc.) and are connected to the lead arm. Expansion and retraction of the lead arm can also be achieved via a scissor mechanism that is connected to vertical channels mounted on the side of the structure. It is also possible for the arms to use a telescopic mechanism to enable the expansion and retraction of the system. The movement of the arms can be achieved by a motive element (e.g., bidirectional), for example a pneumatic, a hydraulic, a mechanical, a gravitational, or an electrical motive element.

In the closed position, the solar modules in the stack and the lead arm are collapsed together at the base. When expansion is triggered, electrically or mechanically, the lead arm begins to move away from the structure on which the awning is mounted, pulling the last stacked solar panel along with it. For example, if solar modules in the awning include module $m_a$ at the awning base and $m_z$ at the lead arm, module $m_z$ is the first module to move away from the base once the lead arm moves from the base, expanding the awning. Since the last solar panel (e.g., $m_z$) in the stack is connected mechanically to the one next to it (e.g., $m_{z-1}$), that panel is also pulled along, which in turn pulls the next one in the stack (e.g., $m_{z-2}$) along with it. This continues until the first panel in the stack (e.g., $m_a$) is pulled along. Since the first module in the stack is also attached to the base of the awning, the expansion stops at this point.

The modules or panels in the awning may be interconnected to each other mechanically by several means. In some embodiments, the modules can include several solar cells arranged next to each other in rows and laminated between the same front sheet, back sheet, and encapsulant materials, with one or more rows of solar cells separated from adjacent rows of solar cells by a fold along the seam of each row. It should be appreciated that the modules would fold and stack together like an accordion or a hand fan.

In some embodiments, each solar panel in the form of a strip may be connected to the next one using hinges. In alternate embodiments, the panels may not be connected at the seams (or may not have seams) but are disjointed (e.g., separated from each other as a discrete, individual piece). In such embodiments the modules are preferably connected to one another using a string, line, or cable (e.g., steel wire, etc.) or any other attachment mechanism to ensure that the movement of one panel enables the movement of adjacent panels, and in turn the other panels in the stack.

Attached to the lead arm is a rotating drum that winds and un-winds a wire or several wires that anchored to the base of the awning. As the lead arm moves away from the base of the awning, the drum rotates to unwind the wire and as the lead arm moves towards the base of the awning, the wire is wound onto the rotating drum to ensure that the tension on the wire is maintained.

The wire that winds on the drum (called the lead wire) strings through the solar panels or modules, for example the bottom of the strips, the top of the strips, the center of the strips, or any other portion of the panel or some combination thereof depending on the embodiment. For example, when the panels are interconnected at the seams, either using foldable lamination techniques or hinges, the interconnecting string can be placed either at the top or bottom, of each strip. In the scenario that the panels or modules are not integrally connected to each other at the seams, but are separate from one another as discrete panels, the rotating wires may be strung through the top of the panels to ensure that these solar panels have some support mechanism to hang from, but can also be strung through the bottom of each panel or strung through another portion of the panel, for example a place between the bottom and the center, or a place between the center and the top, or multiple places therein.

As the lead arm moves back and forth (e.g., away from and toward the base), the rotating drum simultaneously rotates to wind and unwind the interconnecting lead wire through the panels, ensuring that the tension on the wire is constant. This allows the stack of panels to stay substantially in a specified plane as the awning is expanded or retracted.

When panels are interconnected at the seams and the lead arm is fully expanded, the solar panels automatically form a continuous covering on the top of the awning with solar cells facing the sun, both proving shade and generating energy.

On the other hand, in embodiments where the panels are detached from one another, when the lead arm is fully extended the solar panels will hang from the lead wire separated by the length of the attachment between the panels. In that case, an additional mechanism is needed to tilt the panel sideways from a vertical position to a substantially horizontal position so that the panels can form a continuous covering at the top of the awning, with solar cells facing the sun and providing shade below.

The tilt of the panels (e.g., hanging panels) can be achieved by using an interconnection between each panel at the bottom, top, or middle of the panel (or somewhere in between or combinations thereof). The interconnection between each panel can be actuated at either end of the awning (base side or the lead arm side), or actuated on each panel individually, to tilt the panels sideways (e.g., toward horizontal). The ability to tilt the panels on both ways, for example solar cells pointing up or solar cells pointing down, favorably allows for the solar panels to be directed downward for inspection, repair, or cleaning.

The solar panels are electrically interconnected to one another, for example in series, parallel, or a combination thereof, and preferably arranged in an architecture to produce maximum energy. The generated power from the awning can be converted to AC using an inverter and fed into the grid of the building that the awning is attached to or used to power AC based appliances. Alternatively, the generated DC power can be connected to a charge controller and used to power DC appliances directly or stored into a battery system and used to power appliances used for off-grid applications, such as camping or recreational vehicles. Viewed from another perspective, the photovoltaic awning is coupled with a charge controller, inverter or energy storage system, such that energy collected or generated by the awning during the day can be used or stored for use at night or when there is insufficient light.

The awning may further have sensor(s) to detect adverse weather conditions, such as high wind or hail. In the embodiment when the panels are detached from one another, they may be designed to tilt upwards to allow wind to flow through under adverse conditions. In some embodiments, the panels may automatically retract if the weather conditions threaten to damage the awning. The awning may also have other sensors to detect obstructions during operation (e.g., shadow on the panel) or removal of the system from the mounted surface to prevent theft. In preferred embodiments, the system may have the ability to provide information regarding the optimal orientation of the vehicle or the tilt of the panels in order to ensure that the solar generation system generates maximum possible energy. The system may be designed to tilt the panels during the day to track the sun and maximize energy generation.

While it is contemplated the awnings incorporate solar elements (e.g., photovoltaic cells, etc.), additional elements can be incorporated into the awnings, for example a light emitting diode, an organic light emitting diode, a thermal element, a wooden support element, a metallic support element, or a plastic support element. For example, an awning can collect or generate energy during the day via solar elements and provide light and heat at night via the light emitting or thermal elements.

Various objects, features, aspects and advantages of the inventive subject matter will become more apparent from the following detailed description of preferred embodiments, along with the accompanying drawing figures in which like numerals represent like components.

DETAILED DESCRIPTION

The present invention provides a unique, smart and commercially deployable, expandable solar awning and canopy systems.

Awnings or canopies are contemplated that have a base and a leading arm. The base is typically coupled to a surface, for example the eave or roof of a structure or the side of a vehicle (e.g., RV). A first panel is coupled to the base of the awning and a second panel is coupled to the first panel and the leading arm of the awning. It is contemplated that the panel can be made of polymers, glass, wood, metal, or combinations or composites thereof, and can further incorporate functional elements, such as lights, sensors, heaters, acoustic devices, displays, or photovoltaic cells. In preferred embodiments, the panels are at least partly photovoltaic panels, preferably mostly photovoltaic panels, and more preferably predominantly photovoltaic panels. In some embodiments, photovoltaic cells make up at least 60% of a surface of the panels, preferably at least 70%, 80%, 90%, or more preferably at least 95% of a surface.

While the first and second panel can be directly coupled together (e.g., via a foldable seam, via a hinge, via a connecting wire, etc.), in preferred embodiments the panels are indirectly coupled, for example via interstitial panels arranged between the first and second panels. Viewed from another perspective, a stack of photovoltaic panels in the awning includes the first and second photovoltaic panels and a plurality of interstitial photovoltaic panels, such that the plurality of photovoltaic panels are arranged between the first and second photovoltaic panels, generally oriented in a vertical direction and stacked horizontally. A motive element is coupled to the leading arm, which moves the lead arm away from or towards the base, such that the second panel (and any interstitial panels) moves in conjunction with the lead arm to expand (e.g., open) or retract (e.g., close) the awning.

In some embodiments, the awnings or canopies also have a processor to monitor the orientation of the first and second (and interstitial) photovoltaic panels. For example, orientation of the panels can be monitored with respect to a solar energy source (e.g., sun, etc.), and determine a tilt of the photovoltaic panels toward the solar energy source to maximize energy production, and optionally tilt the panels accordingly. The panels (e.g., first panel) can further be tilted to a cleaning conformation, where a photovoltaic surface of the panel faces downward and is easily accessible for cleaning. It should be appreciated that tilting of the panels towards the sun through the day and regular cleaning of a photovoltaic surface of the panel can improve power generation by more than 10%, 20%, or even more than 40%. Likewise, a processor can be used to monitor the orientation of the awning with respect to a solar energy source, and determine a tilt of the awning to maximize production of energy from the solar energy source.

It should be appreciated that the lead arm typically moves away from the base toward an open conformation, such that the plurality of interstitial photovoltaic panels are splayed out evenly along the awning. Likewise, the lead arm moves toward the base to a closed conformation, where the interstitial photovoltaic panels are stacked together and compacted, and in some embodiments enclosed in a protective enclosure.

While it is contemplated that the motion of the lead arm is generally controlled by an electrical motor for its actuation, the arms are also designed to operate by manually operating the motive element (e.g., turning a crank, pulling a line, extending a pole, etc.) in a default mode, in case the electrical actuation fails. In other embodiments it is conceivable that the motive element can also be operated via pneumatic force, hydraulic force, mechanical force, electromagnetic force, or gravitational force.

A cover can also attach to the awning to protect the first panel (and plurality of panels) from the environment (e.g., hail, sand, lightning, etc.) and optionally to remove debris (e.g., leaves, snow, etc.) from the awning.

The awning can incorporate several sensors that enable intelligence or smart operation of the system. For example, a sensor can detect a weather condition, such that the sensor triggers tilting the first panel (or all panels) from a substantially horizontal orientation to a slightly vertical orientation in order to allow the wind to flow through the awning to reduce the lift forces from the wind on the awning. When the wind forces and weather condition exceed a damage threshold, the sensor triggers the panels to tilt fully vertically and triggers the lead arm to move toward a closed conformation, closing the awning for safety.

Awnings and canopies can also include a sensor to detect an obstruction near the awning (e.g., tree branch, umbrella, pole, person), such that the sensor triggers retraction of the awning (via retraction of the lead arm) toward the base to a closed conformation, if such an obstruction is detected. Awnings or canopies can also be coupled to a vehicle, and preferably further include a sensor to detect a motion of the vehicle, such that retraction of the awning (via the lead arm) is triggered by the sensor, so that the driver does not drive away with the awning in the open confirmation. In preferred embodiments, when coupled to a vehicle, the panels of the awnings retract into its enclosure when motion of the vehicle is detected. Likewise, when the awning base is attached to a surface, a safety alarm can be further included to alert the user if the awning base is detached from the surface. A sensor can also be used to detect an amount of shade on the awning, such that the sensor sends a signal to a user when the amount of shade exceeds a shade threshold.

A photovoltaic cell, or plurality thereof, can also be embedded in the lead arm, or in an enclosure that contains the awning when the awning is in a closed conformation, such that power generation is enabled even when the awning is closed.

Figure 1:
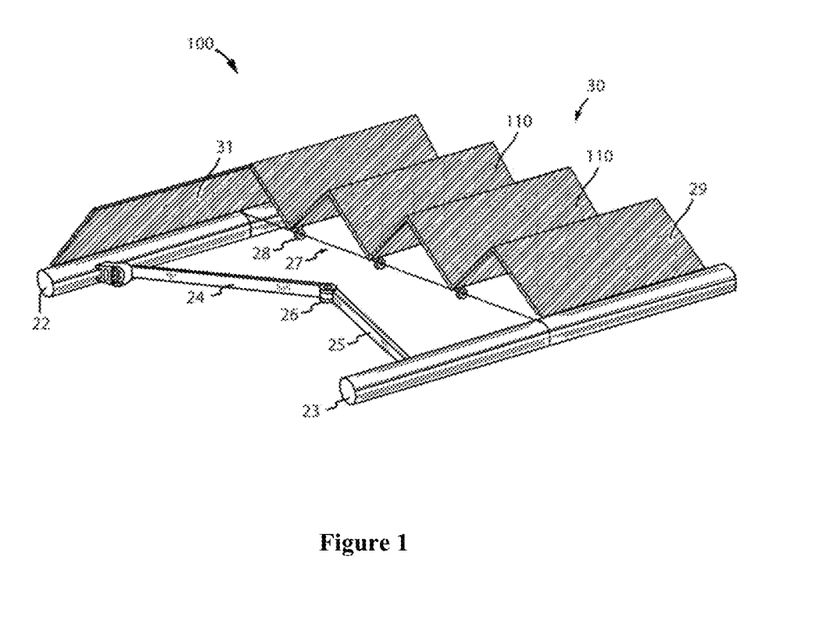
FIG. 1 illustrates the operation of the awning using a series of physically attached solar panels and using the 'Folding Arm Mechanism' for expansion and retraction of the awning.

FIG. 1 illustrates the expansion of the awning using physically attached solar panels and using the "Folding Arm Mechanism" 30. An expansion of mechanism 30 may be achieved using hinged retractable arms that swing in and out to retract or expand the system. For example, a frame bar 22 and a lead bar 23 are connected at both ends by two rods 24, 25 shown on one end (and another similar pair of arms attached on the other end that is not shown), joined together by hinge, 26 for example, that the rods pivot around as shown in FIG. 1. A vertical stack 100 of solar panels 110 connected to each other may be positioned above the retracting arm mechanism 30 with the lead bar 23 mechanically attached to a last solar panel 29 of stack 100 while frame bar 22 is mechanically attached to the first solar panel 31 of stack 100. In a closed position, frame bar 22 lead bar 23, and the two connecting arms 24, 25 at one end, and another identical set of arms at the other end, are all positioned close to each other with the solar panels stacked together vertically above them and mechanically connected to each other as shown.

The expansion of the awning utilizing mechanism 30 (FIG. 1) may be triggered by a remote-control device that uses, for example, a transmitter to activate, a receiver in the awning that may be coupled to an electrical motor and a linear actuator connected to lead bar 23. As the signal is provided by the transmitter in the remote device, the receiver triggers the linear actuator to extend, which moves lead bar 23 out as shown in FIG. 1 pulling last solar panel 29 with the lead bar and subsequently all the other solar panels in the stack along with the lead bar to enable an expansion of the awning. Similarly, when a retraction of the awning is triggered, lead bar 23 starts to move towards the frame bar 22 pushing on the last solar panel 29. This in turn triggers the collapse of all the solar panels attached to the last solar panel 29 toward frame bar 22 leading to a desired retraction of the system.

The panels may additionally be interconnected at the bottom of the panel as in this case (or at the top in an alternate embodiment) via an opening in each panel, for example an opening 28, using a rod, a cable, or a string 27 (collectively called the anchoring support) that is attached to the frame bar and may be wound up or down on a rotating drum attached to the lead bar. As the lead bar starts to move forward, the rotating drum un-winds the anchoring support and as the lead bar moves towards the frame bar it winds tighter on the string. This mechanism allows the string to maintain a constant tension and ensures the solar panels stay in a fixed plane and do not buckle due to the pressure from the retracting arm.

Alternative configurations of the awning/canopy using the 'Retracting Arm Mechanism' or the 'Scissor Mechanism' to move the lead arm forward may use hydraulic, pneumatic, or mechanical actuation as an alternative to or in conjunction with the electrical actuation. Also, the system may be designed to have a backup/override mechanism that uses a manual mechanical actuator, to fold/unfold the panels in the event the electrical actuator system fails in another example.

Figure 2A:
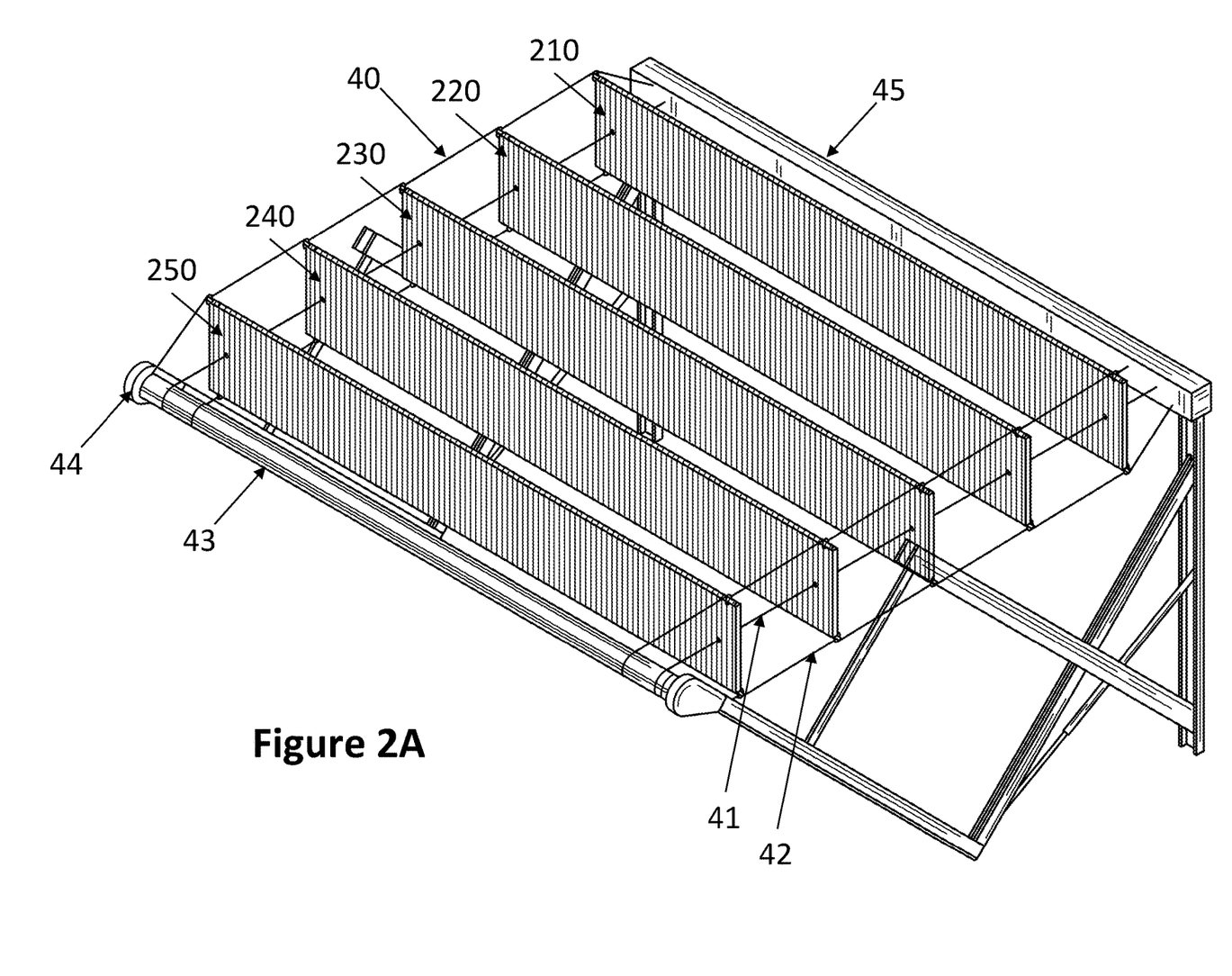
FIGS. 2a and 2b illustrate the operation of the awning using physically detached but interconnected solar panels using the 'Scissor mechanism' for expansion and retraction of the awning.
Figure 2B:
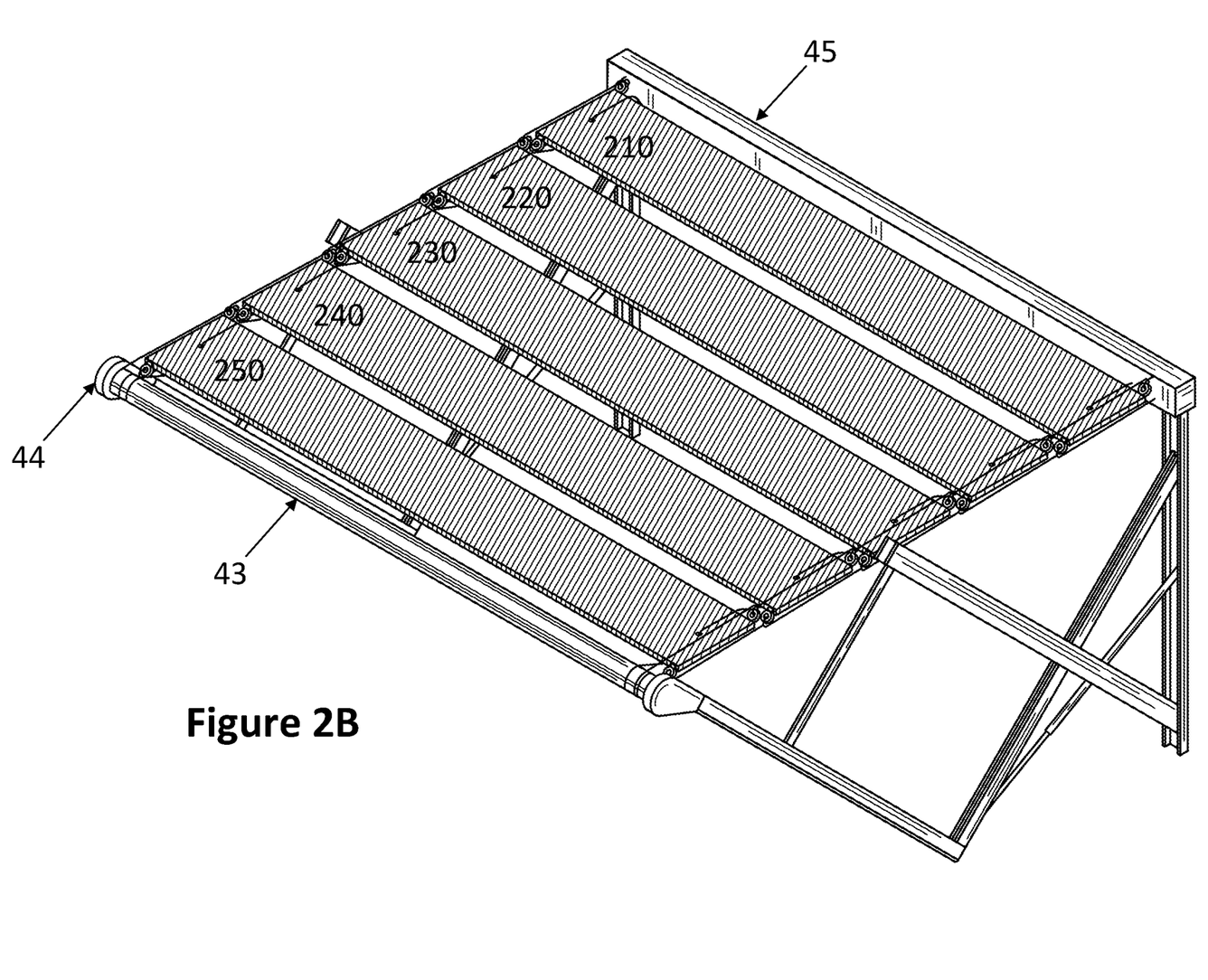

FIG. 2a depicts the operation of physically disjointed panels (panels that are not physically connected at any edge with each other) but are interconnected to each other via a string or other such attachment mechanism. FIG. 2a illustrates a stack of solar panel 200 that are interconnected to each other by string or a wire or a rod 40. The string 40 allows the panels in the stack (210, 220, 230, 240 and so on) to be separated from each other by the length of the string when fully expanded. The first panel in this stack, panel 210 is connected to the base of the awning 45 (either directly attached or indirectly by other means such as a string) and the last panel in the stack is connected to the lead arm of the awning 44 (either directly attached or indirectly by other means such as a string). In addition to attachment means 40, the panels are also connected to each other by another attachment mechanism 41 (string, wire or rod) that is fixed to one end of the awning and is wound on the other end of the awning to the rotating drum 43. As the lead arm 44 moves away from the base of the awning 45, the string or wire 41 is unwound on the drum and when the lead arm 44 moves towards the base of the awning 45 the string or wire 41 is wound tighter on the drum. This allows this string or wire 41 to maintain its tension at all time and hence allows all the panels to be supported on this wire or string 41 at a given plane. When the lead arm 44 is fully expanded, all panels in the stack 200 will be anchored on the support string mechanism 41 and will be separated by the length of the attachment 40. In addition to the connection mechanism 40 and 41, there is another connection 42 between the panels at the base of the panel. This interconnected string or wire 42 at the base of the panel allows the panels to be tilted one way or the other when the panels are fully expanded, thereby closing the gaps between the panel to produce a contiguous roof for the awning when deployed as shown in FIG. 2b.

This discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention. Unless a contrary meaning is explicitly stated, all ranges are inclusive of their endpoints, and open-ended ranges are to be interpreted as bounded on the open end by commercially feasible embodiments.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A photovoltaic awning comprising:
a plurality of photovoltaic panels, each photovoltaic panel coupled to adjacent photovoltaic panels and arranged between a first and a last photovoltaic panel;
a base of the awning, providing support to permit mounting of the awning from the base at a single end, coupled to the first photovoltaic panel;
a lead arm of the awning coupled to the last photovoltaic panel; and
a rotating drum, comprising at least one wire and an anchoring support mechanism anchored to the awning, so as to facilitate deploying and retracting the awning solely from the base, wherein the rotating drum rotates to unwind the wire as the lead arm moves away from the base toward an open conformation, or the wire is wound onto the rotating drum so as to place tension on the wire as the lead arm moves towards the base toward a closed conformation, and wherein the plurality of photovoltaic panels move in conjunction with the lead arm.

2. The photovoltaic awning of claim 1, further comprising a tilt mechanism coupled to the plurality of photovoltaic panels, wherein the tilt mechanism tilts the photovoltaic panels when the awning is in an open conformation.

3. The photovoltaic awning of claim 2, wherein the tilt mechanism tilts a photovoltaic surface of the photovoltaic panels to face downwards to form a cleaning conformation.

4. The photovoltaic awning of claim 1, further comprising a processor to determine the orientation of the plurality of photovoltaic panels and estimate an optimal tilt of the plurality of photovoltaic panels to maximize energy production.

5. The photovoltaic awning of claim 1, further comprising a processor to determine the orientation of the awning and estimate an optimal tilt of the awning to maximize energy production.

6. The photovoltaic awning of claim 1, wherein movement of the lead arm is triggered by a signal from at least one of a remote-controlled device or a switch.

7. The photovoltaic awning of claim 1, wherein the mechanism is operated manually or by pneumatic force, hydraulic force, an electrical motor, or gravitational force.

8. The photovoltaic awning of claim 1, further comprising a cover attached to the plurality of photovoltaic panels, wherein the cover provides at least one of (i) support to the awning, (ii) protection of the awning from an environmental condition, or (iii) removal of a debris from the awning.

9. The photovoltaic awning of claim 1, further comprising a sensor to detect obstructions near the awning, wherein the sensor triggers moving the lead arm toward the closed conformation.

10. The photovoltaic awning of claim 1 coupled to a vehicle, further comprising a sensor to detect a movement of the vehicle, wherein the sensor triggers moving the lead arm toward the closed conformation.

11. The photovoltaic awning of claim 1, further comprising a sensor to detect a weather condition, wherein the sensor triggers tilting the plurality of photovoltaic panels from a substantially horizontal orientation to a substantially vertical orientation.

12. The photovoltaic awning of claim 11, wherein the sensor triggers moving the lead arm toward a closed conformation when the weather condition exceeds a damage threshold.

13. The photovoltaic awning of claim 1, wherein the base is attached to a surface, and further comprising a safety alarm that is triggered when the base is detached from the surface.

14. The photovoltaic awning of claim 1 attached to a vehicle, wherein the plurality of photovoltaic panels is integrated into a chassis of the vehicle when the lead arm is in the closed conformation.

15. The photovoltaic awning of claim 1, further comprising a sensor to detect an amount of shade on the awning, wherein the sensor sends a signal to a user when the amount of shade exceeds a shade threshold.

16. The photovoltaic awning of claim 1, further comprising a photovoltaic cell or cells embedded in the lead arm.

17. The photovoltaic awning of claim 1, further comprising an enclosure that contains the awning when the awning is in a closed conformation, wherein the enclosure further comprises a photovoltaic cell or cells on a surface of the enclosure.

18. The photovoltaic awning of claim 1, further comprising an element incorporated in the awning, wherein the element is selected from the group consisting of a light emitting diode, an organic light emitting diode, a thermal element, a wooden slat element, a metallic slat element, or a plastic slat element.

19. A system comprising the photovoltaic awning of claim 1 connected to at least one of (i) a charge controller or an inverter, and connected to a device selected from the group consisting of (ii) an AC appliance, a DC appliance, or a battery, such that the device is energized by the photovoltaic awning.

20. A photovoltaic awning comprising:
- a plurality of photovoltaic panels, each photovoltaic panel coupled to adjacent photovoltaic panels and arranged between a first and a last photovoltaic panel;
- a base of the awning, providing support to permit mounting of the awning from the base at a single end, coupled to the first photovoltaic panel;
- a lead arm of the awning coupled to the last photovoltaic panel;
- a rotating drum, comprising at least one wire and an anchoring support mechanism anchored to the awning, so as to facilitate deploying and retracting the awning solely from the base, wherein as the lead arm moves away from and toward the base, wherein the rotating drum rotates to unwind the wire as the lead arm moves away from the base toward an open conformation, or the wire is wound onto the rotating drum so as to place tension on the wire as the lead arm moves towards the base toward a closed conformation, and wherein the plurality of photovoltaic panels move in conjunction with the lead arm; and
- a tilt mechanism, coupled to the plurality of photovoltaic panels, wherein the tilt mechanism to tilt the photovoltaic panels as the awning is expanded or retracted in manner as to substantially hold the photovoltaic panels in a specified plane.

21. A photovoltaic awning comprising:
- a plurality of photovoltaic panels, each photovoltaic panel coupled to adjacent photovoltaic panels and arranged between a first and a last photovoltaic panel;
- a base of the awning, providing support to permit mounting of the awning from the base at a single end, coupled to the first photovoltaic panel;
- a lead arm of the awning coupled to the last photovoltaic panel;
- a rotating drum, comprising at least one wire interconnected among the photovoltaic panels and an anchoring support mechanism anchored to the awning, so as to facilitate deploying the awning solely from the base, wherein as the lead arm moves away from and toward the base, the rotating drum simultaneously rotates to wind and unwind, respectively, the wire through the panels ensuring constant tension and allowing the photovoltaic panels to stay substantially in a specified plane.

22. The photovoltaic awning of claim 21, further comprising a tilt mechanism coupled to the photovoltaic panels, wherein the tilt mechanism tilts the photovoltaic panels when the awning is in an open conformation.

* * * * *